United States Patent

Jaeschke et al.

[11] 3,749,216
[45] July 31, 1973

[54] ELECTROMAGNETIC FRICTION COUPLING WITH LEDGING PREVENTIVE MEANS

[75] Inventors: Ralph L. Jaeschke; William H. Moyer, both of Kenosha; Howard E. Wiltsey, Racine, all of Wis.

[73] Assignee: Eaton Corporation, Cleveland, Ohio

[22] Filed: Apr. 16, 1971

[21] Appl. No.: 134,910

Related U.S. Application Data

[63] Continuation of Ser. No. 838,523, July 2, 1969, abandoned.

[52] U.S. Cl. ......... 192/70.14, 192/84 C, 192/107 R
[51] Int. Cl. .................... F16d 13/46, F16d 69/00
[58] Field of Search ................. 192/70.14, 113 B, 192/107 R, 84 A, 84 C

[56] References Cited
UNITED STATES PATENTS

| | | | |
|---|---|---|---|
| 1,519,417 | 12/1924 | Payne | 192/84 A |
| 1,536,588 | 5/1925 | Judd | 192/70.14 X |
| 2,045,452 | 6/1936 | Emrick | 192/107 |
| 2,351,598 | 6/1944 | Cadman | 192/84 A X |
| 2,389,772 | 11/1945 | Gilbert | 192/107 X |
| 3,048,250 | 8/1962 | Kershner | 192/113.2 X |
| 3,433,339 | 3/1969 | Martin et al. | 192/113.2 X |

Primary Examiner—Benjamin W. Wyche
Attorney—Teagno and Toddy

[57] ABSTRACT

A coupling transmits torque between driving and driven members. Each of these members has a torque transmitting surface which, when in an engaged position, establishes a driving relationship between the members and when in a disengaged position, allows relative rotation between the members. When the members are in a driving relationship, their respective surfaces generate wear contaminants when transmitting torque therebetween. One of the members has means for directing the wear contaminants from the torque transmitting surfaces. In addition, one of the members has at least one annular groove therein operable to substantially eliminate wear projections from being created on the one member.

9 Claims, 5 Drawing Figures

INVENTORS
RALPH L. JAESCHKE
WILLIAM H. MOYER
HOWARD E. WILTSEY
BY Yount and Tarolli
ATTORNEYS

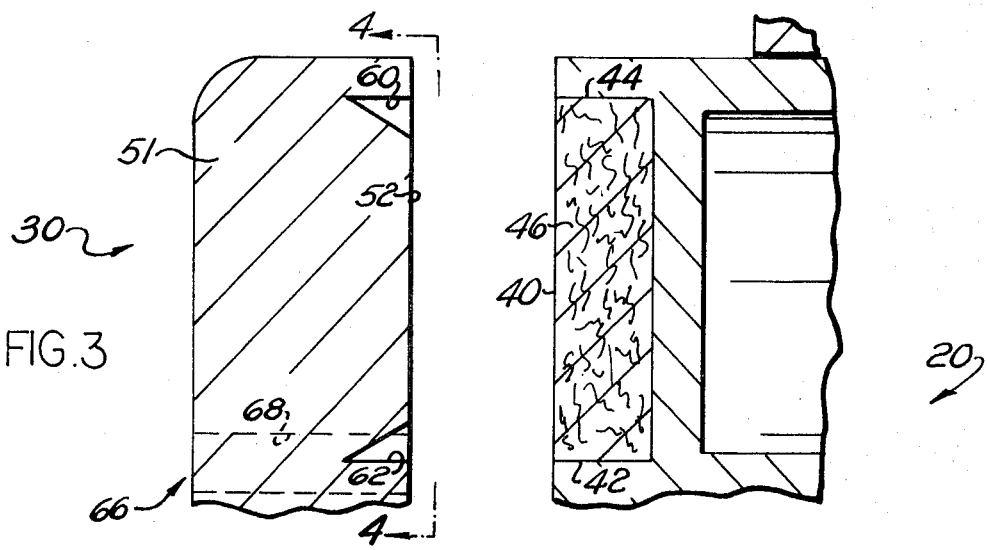
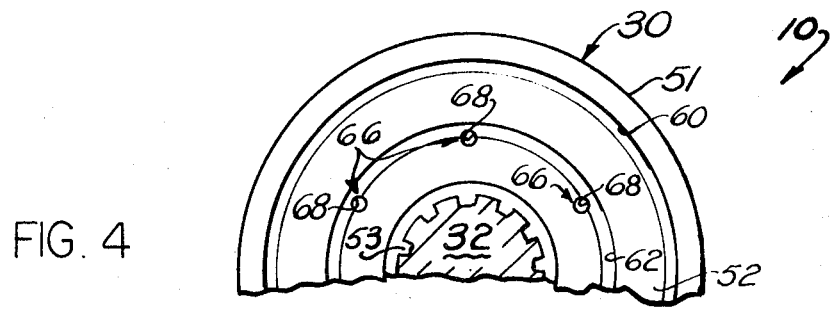
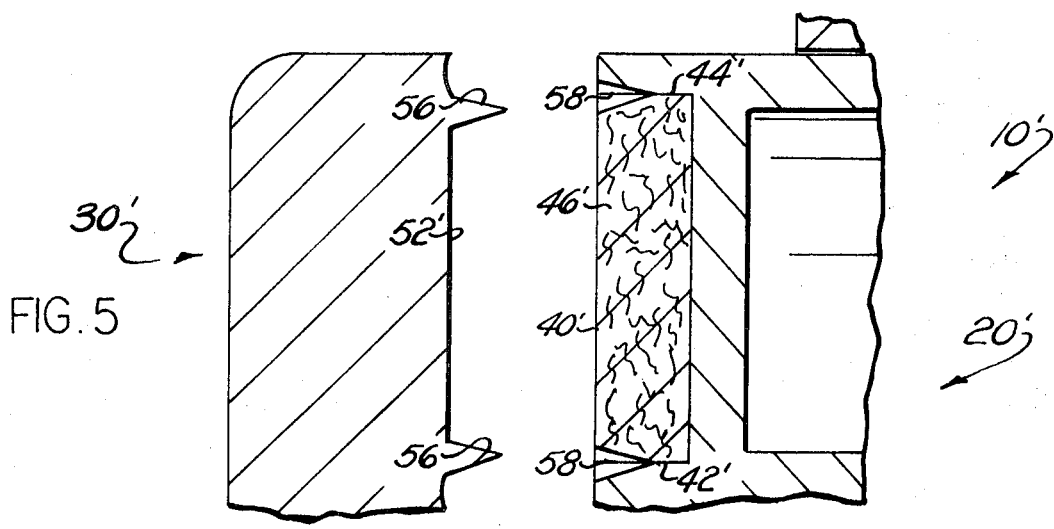

AN ELECTROMAGNETIC FRICTION COUPLING WITH LEDGING PREVENTIVE MEANS

This application is a continuing application of Ser. No. 838,523, filed July 2, 1969 and now abandoned.

The present invention relates to a coupling for transmitting torque between input and output members, and particularly relates to a coupling including driving and driven members having torque transmitting surfaces and means for moving one member into torque transmitting relationship with the other.

Couplings for transmitting torque between driving and driven members are known. The known couplings include means for moving driving and driven members into a torque transmitting relationship. Each of the members have torque transmitting surfaces which engage to transmit torque therebetween when in their torque transmitting relationship. The means for moving the members may be of various constructions. For example, an electromagnetic coil may be incorporated in such a coupling to position the torque transmitting surfaces in engagement with each other such that torque may be transmitted therebetween.

Generally, these coupling devices have an organic material defining one of the torque transmitting surfaces. The torque transmitting surface defined by the organic material is usually annular and has an inside and outside perimeter. The other torque transmitting surface is usually defined by a metallic member.

When these two torque transmitting surfaces engage and disengage each other in a series of cycles, wear projections are created on the torque transmitting surface defined by the metallic material. Also, complimentary grooves are formed by the surface defined by the organic material. This wear characteristic is commonly referred to as "ledging". Usually these ledges and grooves, respectively, form at the inside and outside perimeters of the torque transmitting surfaces.

As "ledging" increases, the projections extend into the grooves in the organic torque transmitting surface and axial separation of the members is resisted thereby. As a result, the torque transmitting surfaces can no longer be readily engaged or disengaged. In an extreme case, the projections lock with their complimentary grooves on the organic torque transmitting surfaces such that the driving and driven members become locked together. Moreover, ledging reduces the area of the torque transmitting surfaces and thus creates an increase in wear of the torque transmitting surfaces provided the torque transmitted therebetween remains the same. As a result, the amount of wear contaminants correspondingly increases.

In the known couplings, as noted, wear contaminants are generated as a result of transmitting torque between the driving and driven members. When the contaminants are not removed, the problem of "ledging" further increases and the wearability of the torque transmitting surfaces decreases.

The present invention overcomes the above noted problems of the prior art by providing annular grooves in one of the torque transmitting members in alignment with the inner and outer perimeter of the other torque transmitting surface and openings connected to at least one of the annular grooves. The annular grooves thus eliminate material which would normally create the wear projections extending into the organic torque transmitting surface and thus, "ledging" is substantially reduced. The openings connected to at least one of the annular grooves are operable to carry away contaminants from the torque transmitting surfaces. It is apparent that generally these openings are in communication with the inner annular groove since wear contaminants will be most advantageously removed from this groove.

Accordingly, it is a principle object of the present invention to provide a coupling housing driving and driven members and which includes means for directing wear contaminants from the torque transmitting surfaces of the members.

Yet another object of the present invention is to provide a coupling having driving and driven members wherein openings are provided in communication with the torque transmitting surfaces of the members for directing wear contaminants away from these torque transmitting surfaces.

It is yet another object of the present invention to provide a coupling having driving and driven members and which is operable to substantially reduce the amount of "ledging" between the torque transmitting surfaces of the members.

It is yet a further object of the present invention to provide a coupling having driving and driven members and wherein one of the members has annular grooves in alignment with the inner and outer perimeter of the torque transmitting surface of the other member such that "ledging" is substantially reduced.

It is yet another object of the present invention to provide a coupling having driving and driven members and wherein wear projections are substantially eliminated such that the members can be freely engaged and disengaged.

Further objects and advantages of the present invention will be apparent to those skilled in the art to which it relates from the following detailed description of a preferred embodiment thereof made with reference to the accompanying drawings in which:

FIG. 3 is a fragmentary view on an enlarged scale of the torque transmitting surfaces shown in FIG. 2;

FIG. 4 is a fragmentary view illustrating the torque transmitting member of FIG. 3 and taken approximately along lines 4—4 of FIG. 3; and FIG. 5 is a fragmentary cross-sectional view of a representative prior art device illustrating the problems of the prior art device.

Figure 1:
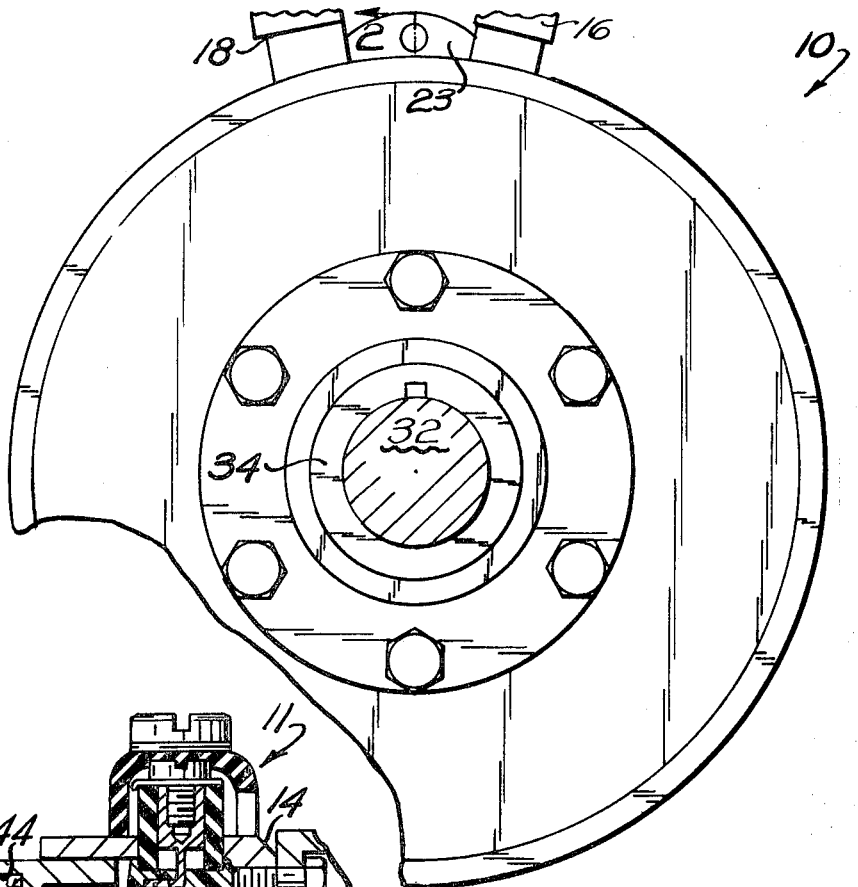
FIG. 1 is a fragmentary end view of a representative coupling of the immediate invention.
Figure 2:
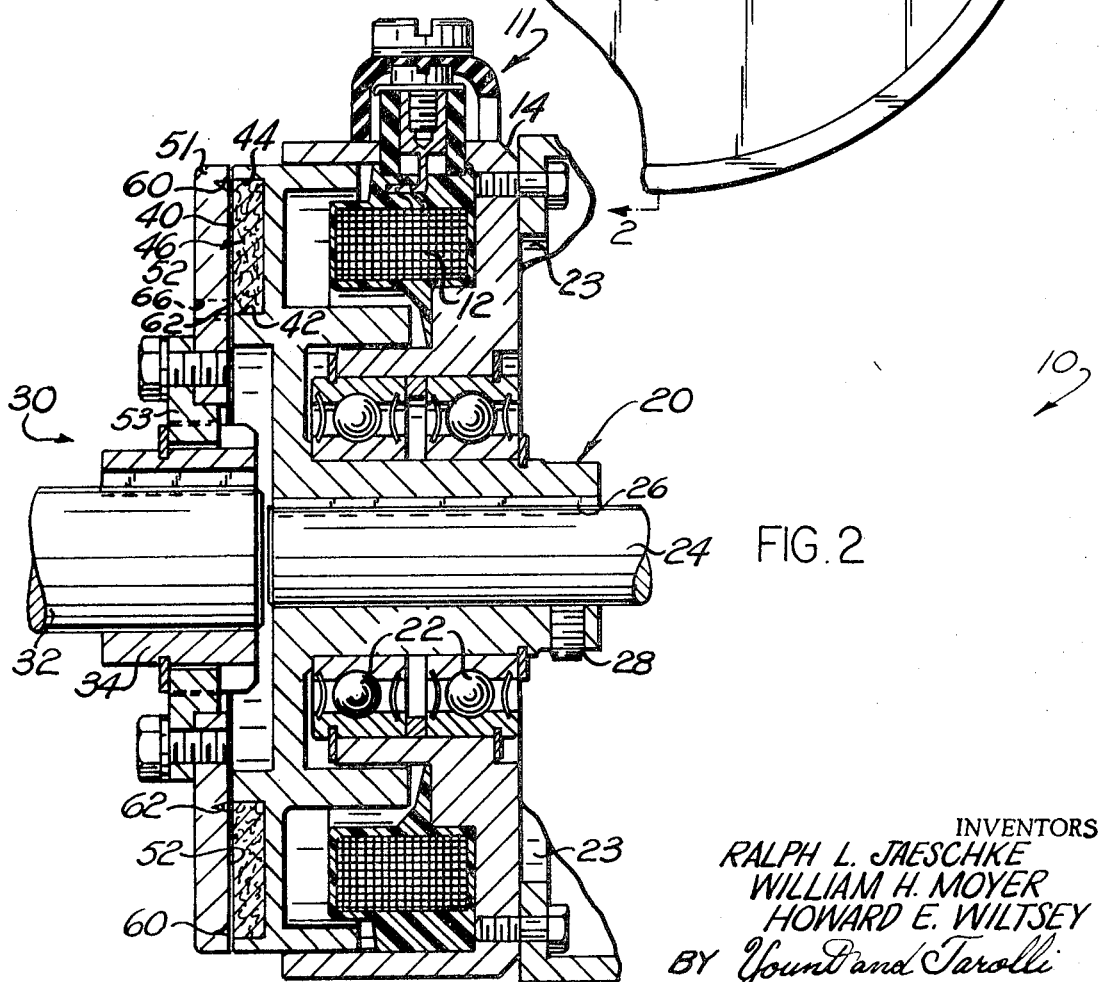
FIG. 2 is a cross-sectional view of the coupling shown in FIG. 1 taken along line 2—2 thereof.

The present invention provides a coupling having driving and driven members and means for moving the members into a torque transmitting relationship. The coupling of the present invention is adapted to substantially reduce the problem of "ledging" and incorporates means to carry away contaminants from the torque transmitting surfaces of the coupling. Thus, the coupling of the immediate invention has an extremely long life. The present invention may be applied to couplings of a wide variety of constructions and designs and for purposes of illustration is described in connection with coupling 10 shown in FIGS. 1 and 2.

While the coupling 10 may transmit torque in either direction, the coupling 10 is described hereinabove as having a driving and driven member. It should be understood, however, that the driving and driven members may be reversed. The coupling 10 includes a driving member 20, and a driven member 30, and means for moving the members 20 and 30 into a torque transmitting relationship. The means 11 includes an electromagnetic coil 12 supported by a stationary housing 14. The stationary housing 14 has lead receptacles 16 and 18 thereon adapted to receive electrical current and supply that electrical current to the electromagnetic coil 12. The housing 14 is stationary with respect to the driving member 20 and bearings 22 are interposed between the housing member 14. Brackets 23 are connected to the housing 14 and are attached to a fixed member to support and prohibit rotation of the housing 14.

The driving member 20 is non-rotatably attached to an input or driving shaft 24 by means of a key 26 and set screws generally indicated at 28. It should be noted that the set screws 28 restrain the driving shaft 24 and member 20 in an axial direction while the key 26 restrains the driving member 20. The driving shaft 24 is adapted to transmit power to the driving member 20 such that power may be supplied to the driven member 30 when the electromagnetic coil 12 is actuated to position the driving member 20 in the torque transmitting relationship with the driven member 30.

The driving member 20 has a torque transmitting surface 40 which is annular in configuration and has an inner and outer perimeter 42, 44, respectively. The torque transmitting surface 40 is an annular surface of a member 46 which is supported in an annular recess in the driving member 20.

The driven member 30 is keyed to an output shaft 32 and specifically includes a splined member 34 keyed to the shaft 32. An annular member 53 has internal aplines which mesh with the splines on the member 34 to provide a driving relationship therebetween. An annular torque transmitting member 51 is suitably fastened to the member 53 and has a torque transmitting surface 52 which is adapted to engage surface 40 to transmit torque therebetween.

When the coil 12 is activated, the driven member 30 moves into an engaged position with respect to the driving member 20 such that the torque transmitting surface 52 of the driven member 30 and torque transmitting surface 40 of the driving member 20 are in an engaged torque transmitting relationship. In such a manner, torque is transmitted from the driving shaft 24, to the driven shaft 32. When coil 12 is deactivated, the member 30 moves out of torque transmitting relationship with the member 20.

In order to fully appreciate the advantages of the present invention, FIG. 5 is included to show the problem of "ledging" involved in the prior art. To facilitate the description of the prior art, the same reference numerals used in connection with FIGS. 1 and 2 will be used to designate similar parts in FIG. 5; however, with a prime added.

When a clutch 10' of the prior art is engaged and disengaged repeatedly, certain wear characteristics of the torque 20', 30', respectively, occur. After repeated operation, wear projections 56 would be created on the torque transmitting surface 52' in the area of the inner and outer perimeters 42' and 44'. These wear characteristics of the prior art clutches are commonly known as "ledging".

As the wear projections 56 and corresponding wear cavities 58 increase in size, it becomes increasingly difficult to engage and disengage the driving and driven members 20' and 30', respectively, until a point is reached where the driving and driven members 20' and 30', respectively, become locked with respect to each other.

In addition to the "ledging" problem, there is a continual problem of removing wear contaminants from the torque transmitting surfaces 40', 52'. If the contaminants remain on these torque transmitting surfaces 40', 52', the efficiency of such a coupling and its start-stop characteristics are detrimentally restricted.

The coupling 10 of the immediate invention overcomes the problems of "ledging" and wear contaminants remaining on the torque transmitting surfaces 40, 52. By providing annular grooves 60 and 62 in the driven member 30, as best seen in FIGS. 3 and 4, the material of the member 30 is removed which would ordinarily create wear projections on a driven member 30, as noted in connection with FIG. 5. The inner and outer annular grooves 60, 62, respectively, in the driven member 30, are in alignment with the inner and outer perimeters 42, 44, respectively, of the torque transmitting surface 40 of the driving member 20. Thus, when the driving member 20 engages the driven member 30, the tendency for "ledging" to occur is substantially reduced and consequently, the life of a clutch 10 of the immediate invention is substantially increased over the prior art.

It should be understood that these annular grooves 60, 62 may be incorporated in either of the driving or driven members 20, 30, respectively, and are merely respresentative to show the concept of removing material where the projections tend to form. Moreover, it is apparent that dependent on the particular coupling design, annular grooves could be advantageously positioned in areas other than in alignment with inner and outer perimeters 42, 44, respectively.

The torque transmitting member 46 may be made of any friction material, but as shown in FIG. 3, is made of an organic friction material, as well known by those skilled in the art. The torque transmitting member 51 is commonly manufactured from a steel such as silicon steel for use in conjunction with the electromagnetic coil 12. The material of which these members are made could vary and the present invention could be applied thereto.

In order to conduct the wear contaminants from the torque transmitting surfaces 40, 52, means generally noted at 66 are provided. The means for directing wear contaminants away from the torque transmitting surfaces 40, 52, include openings 68 in the driven member 30. These openings 68 extend throughout the axial extent of the member 30. Thus, when the wear contaminants drop, they are allowed to enter the openings 68 and leave the torque transmitting surfaces 40, 52, through the openings 68. The openings 68 communicate with the inner annular groove 62 such that wear contaminants received in the groove 62 may flow therefrom through the openings 68.

It should be understood that the openings 68 need not be positioned to communicate with the annular grooves 60, 62, but rather may be so positioned to facilitate a more efficient removal of the wear contaminants dependent on the particular coupling design. It should be further understood that the openings 68 may be incorporated in the driving member 20 instead of the driven member 30, as shown in FIGS. 3 and 4. Moreover, the number of openings may vary according to the size of the coupling and the amount of torque transmitted thereby since the relationship is dependent on the amount of contaminants generated by engagement and disengagement of the coupling.

It should be apparent from the above that applicant has provided a highly improved coupling which is specifically designed to eliminate the problems of "ledging" and wear contaminants decreasing the efficiency of the coupling. To reduce the problem of "ledging" the immediate invention provides annular grooves in either the driving or driven members in the area in which wear projections would naturally occur. Means for directing wear contaminants from the torque transmitting surfaces of the driving and driven members are provided and include openings in communication with the torque transmitting surfaces of the driving and driven members in a manner such that the wear contaminants may be directed from the torque transmitting surfaces.

What we now claim is:

1. A coupling comprising rotatable driving and driven members, said driving and driven members having first and second torque transmitting surfaces, one of said driving and driven members having said first torque transmitting surface thereon and the other of said driving and driven members having said second torque transmitting surface thereon, said first and second torque transmitting surfaces having an engaged position establishing a driving relationship between said members and a disengaged position permitting relative rotation between said members, said surfaces generating wear contaminants when in said engaged position, actuating means operable to move one of said driving and driven members relative to the other of said driving and driven members to effect relative movement of said torque transmitting surfaces from one of said positions to the other position, said second torque transmitting surface comprising a metallic surface having at least one annular groove therein in substantial axial alignment with a perimeter of said first torque transmitting member for minimizing ledging of said metallic surface.

2. A coupling as defined in claim 1 further including an opening for directing wear contaminants through said metallic torque transmitting surface.

3. A coupling as defined in claim 1 wherein said driving and driven members have a common axis of rotation with one of said driving and driven members rotating at a location spaced apart along the axis of rotation from the other of said driving and driven members.

4. A coupling comprising rotatable driving and driven members, one of said driving and driven members having a first torque transmitting surface thereon and the other of said driving and driven members having a second torque transmitting surface thereon, said surfaces having an engaged position establishing a driving relationship between said members and a disengaged position permitting relative rotation between said members, actuating means operative to move one of said driving and driven members relative to the other of said driving and driven members to effect relative movement of said torque transmitting surfaces from one of said positions to said other position, said first torque transmitting surface comprising a friction material having a perimeter, said second torque transmitting surface having at least one annular groove therein for minimizing ledging of said first torque transmitting surface by substantially eliminating wear projections from being created on said first torque transmitting surface, said annular groove being substantially in axial alignment with said perimeter of said friction material when said first torque transmitting surface is in engagement with said second torque transmitting surface.

5. A coupling comprising rotatable driving and driven members, said driving and driven members having first and second torque transmitting surfaces respectively, one of said torque transmitting surfaces is defined by an inner and outer perimeter, the other of said torque transmitting surfaces including an outer annular groove and an inner annular groove, said outer annular groove being in alignment with said outer perimeter of said one torque transmitting surface and said inner annular groove being in alignment with said inner perimeter of said one torque transmitting surface, said first and second torque transmitting surfaces having an engaged position establishing a driving relationship between said members and a disengaged position permitting relative rotation between said members, said surfaces generating wear contaminants when in said engaged position, actuating means operable to move one of said driving and driven members relative to the other of said driving and driven members to effect relative movement of said torque transmitting surfaces from one of said positions to the other position, one of said members having means for directing said wear contaminants from said torque transmitting surfaces.

6. A coupling as defined in claim 5 wherein said means for directing wear contaminants includes at least one opening in communication with at least one of said annular grooves for directing the wear contaminants from said one annular groove.

7. A coupling as defined in claim 6 wherein said means for directing wear contaminants includes at least one opening in communication with said one annular groove for directing wear contaminants therefrom.

8. A coupling comprising rotatable driving and driven members, first and second torque transmitting surfaces associated with said driving and driven members respectively, said surfaces having an engaged position establishing a driving relationship between said members and a disengaged position permitting relative rotation between said members, actuating means operative to move one of said driving and driven members relative to the other of said driving and driven members to effect relative movement of said torque transmitting surfaces from one of said positions to said other position, one of said torque transmitting surfaces having inner and outer annular grooves therein for minimizing ledging of said one torque transmitting surface and the other of said torque transmitting surfaces having an inner and outer perimeter, said inner and outer annular grooves in said one torque transmitting surface being in alignnment with said inner and outer perimeters, respectively, to substantially eliminate wear projections from being created on said one torque transmitting surface.

9. A coupling comprising rotatable driving and driven members, one of said driving and driven members having a first torque transmitting surface thereon and the other of said driving and driven members having a second torque transmitting surface thereon, said first and second torque transmitting surfaces having an engaged position establishing a driving relationship between said members and a disengaged position permitting relative rotation between said members, actuating means for effecting relative movement of said torque transmitting surfaces from one of said positions to the other position, said first torque transmitting surface including a first material and a second material, said second material having a perimeter disposed contiguous to said first material, said second torque transmitting surface comprising a metallic surface having at least one annular groove therein for minimizing ledging of said metallic surface, said annular groove being substantially in alignment with said perimeter of said second material when said first and second torque transmitting surfaces are in said engaged position.

* * * * *